United States Patent Office 2,958,589
Patented Nov. 1, 1960

2,958,589

PROCESS FOR THE PRODUCTION OF A COOLED AMMONIUM NITRATE PRODUCT

Oliver Lloyd Hayes, Sterlington, La., assignor to Commercial Solvents Corporation, Terre Haute, Ind., a corporation of Maryland No Drawing. Filed Sept. 16, 1957, Ser. No. 683,965

1 Claim. (Cl. 23—302)

My invention relates to a process for cooling ammonium nitrate with water, and more particularly to a means of cooling substantially anhydrous ammonium nitrate by applying directly to ammonium nitrate of high temperature sufficient amounts of water to reduce the temperature of the ammonium nitrate without materially increasing the water content of the cooled product.

Anhydrous ammonium nitrate is industrially produced by the process of U.S. Patent No. 2,568,901 and is generally prilled or granulated to obtain an ammonium nitrate product of a desired size. U.S. Patent No. 2,773,753 discloses the method that is generally used in granulating anhydrous ammonium nitrate. In this process molten anhydrous ammonium nitrate is flowed onto a moving flat metal belt having a cooling medium in contact therewith to produce a sheet of solid ammonium nitrate of a desired thickness. This sheet of solid anhydrous ammonium nitrate is then ground to a desired size range. There are several difficulties in using the above-described process: the process cannot be used economically unless there is a large supply of cool water at hand, the water supply must be cool in the summer or adequate cooling for the product will not be obtained, the large amounts of cooling water required in this process cannot be economically cooled for reuse in the process, and as the metal belts used in the process must be heat and corrosion resistant, they must be made of expensive metallic alloys and must be relatively short to be economically feasible.

Where factors such as short belt lengths, insufficient cooling water, or high cooling water temperatures combine to cause high temperature ammonium nitrate to flow into the grinding machines, excessive amounts of fines, ammonium nitrate of particle sizes too small for commercial usage, are formed. Thus ammonium nitrate having a temperature of about 183° F. at the end of the cooling belt yields about 70% of total commercial product as fines after granulation.

I have now discovered an improved process for cooling ammonium nitrate which consists of applying an amount of water to the heated ammonium nitrate which will reduce the temperature of the ammonium nitrate a desired number of degrees without materially increasing the water content of the ammonium nitrate. Using my process I am able to cool ammonium nitrate with a reduced water supply, and with water having a temperature up to about 100° F. As relatively small amounts of water are used as a cooling agent in my process, I am also able to refrigerate the water to be used in the process to temperatures down to about 32° F. with ease. I am also able to reduce the required length of the metal belt without increasing the temperature of the ammonium nitrate to be granulated.

Using my process I have found that I can reduce the customary fines formation from about 70% at 183° F. down to 28% at temperatures of 140° F. when the process of my invention is utilized to further cool the ammonium nitrate, without increasing the water content of the ammonium nitrate more than negligible amounts of the order of 0.1–0.2%. The lower incidence of fines resulting from the lower temperatures increases the efficiency of the whole ammonium nitrate production process as it is not necessary to recycle the fines through the ammonium nitrate process for regranulation.

I find that I can easily apply water to the ammonium nitrate by means of wet rollers, brushes, etc., and by spraying the water onto the ammonium nitrate. I prefer to spray water onto the ammonium nitrate in droplets of the smallest possible diameter as I have found that droplets of small diameter tend to leave less residual water in the ammonium nitrate product than do droplets of large size. I have found that spray nozzles similar to those used in paint spray equipment are adequate but I generally prefer to use spray nozzles causing a smaller diameter droplet formation in the spray.

I find I can apply water to the ammonium nitrate at any stage in the cooling process where the ammonium nitrate has a heat content sufficient to evaporate the water applied so that less than about 0.4% water remains in the final ammonium nitrate product. I prefer to apply the water to the ammonium nitrate after it is solidified on the moving belt as I find that less water retention results under these conditions. I can also reduce water retention by continuously passing a stream of dry inert gas over the surface of the ammonium nitrate.

The amount of water used in the process of my invention is determined by several variables: the temperature of the water being sprayed on the ammonium nitrate, the belt temperature, which is determined by the temperature of the water in contact with its under surface or by its surface area where no cooling water is used on its under surface, or the initial ammonium nitrate temperature. Where the water being sprayed on the ammonium nitrate has a temperature of about 40° F., less water is used in the cooling process than is required when water of a temperature of about 90° F. is utilized. I prefer to use water having a temperature of about 35–40° F. in cooling the ammonium nitrate as a smaller total volume of water is applied to the ammonium nitrate. At ammonium nitrate temperatures of about 32° F. considerably more water may be applied to the ammonium nitrate without increasing the water content thereof than can be applied at 140° F. Where the moving belt is cooled by water of a temperature as low as about 32° F. less water need be applied directly to the ammonium nitrate than in instances where the water in contact with the underside of the moving belt is in the neighborhood of 90° F. Thus, it can be seen that generalizations as to the amount of water required in the process cannot be made in light of all of the variables attending the required amount of water.

In practice the amount of water applied to the ammonium nitrate is governed by measuring the temperature and water content of the product as it is removed from the belt. If the temperature is found to be too high the water flow is increased and if the temperature is so low that the water content of the ammonium nitrate is greater than 0.4% the water flow is decreased.

I have found that the process of my invention is applicable for use in prilling ammonium nitrate in prilling towers which utilize an updraft of air to reduce the rate of fall of the ammonium nitrate prills and to remove heat and thereby reduce the required tower height. The water may be sprayed into the prilling tower from the top or lateral walls of the tower in such a manner that the flow of water droplets impinges upon the downward flow of ammonium nitrate prills. It is preferable to introduce the water spray into the prilling tower at a point where the surface of the ammonium nitrate prills has solidified, though the water spray may be injected into the tower at any desired level. I have also found that the same variables and control methods which apply to the use of my process in cooling ammonium nitrate to be granulated also apply to the use of water in prilling processes.

I have found my new process to be equally efficient in cooling mixed fertilizers prepared by introducing a granular solid component to molten ammonium nitrate prior to granulating or prilling the finished product.

The following examples further illustrate my invention and it is not intended that my invention be limited to the amounts or procedures described herein but rather it is intended that all equivalents obvious to those skilled in the art be included within the scope of my invention.

Example I

Molten substantially anhydrous ammonium nitrate at the rate of 5,300 pounds per hour and having a temperature of 390° F. was flowed onto a flat, stainless steel endless belt moving at the rate of 60 feet per minute over an effective surface length of 90 feet. Water at a rate of 22,000 pound per hour was circulated in contact with the underside of the flat, moving belt in a bed extending under the first 35 feet of the belt length, the temperature of the water entering the bed being 80° F. The molten ammonium nitrate solidified on the belt into a sheet 27 inches wide and about 1/8 of an inch thick. At a point above the belt where the molten ammonium nitrate had become semi-solid, through a set of nozzles of the type normally used in paint spray guns and located two inches above the semi-solid sheet of ammonium nitrate, was sprayed 35 pounds of water per hour at 80° F. temperature. The temperature of the sheet of ammonium nitrate at the end of the belt was 142° F. and contained 0.20% water. This solid ammonium nitrate was run off the end of the belt into a high speed rotating blade type granulator, the granulator outlet consisting of a four-mesh screen with a wire diameter of 0.63 inch. The screen analysis of the product showed the fines to equal 28% of commercially useful product.

Example II

A control run was made under conditions identical with those used in Example I with the exception that no water was sprayed onto the bed of heated ammonium nitrate. In this case, the temperature of the solid ammonium nitrate leaving the belt was 166° F. and the water content was 0.19%. The screen analysis of the product showed the fines to equal 70.7% of commercially useful product.

Example III

To prepare a cooled anhydrous ammonium nitrate prill suitable for bagging, molten ammonium nitrate was sprayed into a prilling tower from nozzles situated in the top of the tower at the rate of 60 pounds per hour. Air was passed upwards through the tower at 700 c.f.m. to retard the rate of fall of the prills and to remove the steam formed by the introduction of 1.0 pound of water per hour into the tower. Ammonium nitrate prills containing 0.22% water and having a temperature of 150° F. were recovered from the bottom of the tower and bagged by conventional means.

Example IV

Using the apparatus and conditions of Example III a control run was made with the exception that no water was injected into the tower. In this instance the temperature of the ammonium nitrate was 220° F. and the water content was 0.20%.

Now having described my invention what I claim is:

A process for the production of ammonium nitrate prills of predetermined size which comprises spraying molten substantially anhydrous ammonium nitrate into a prilling tower through which an updraft of air is passed and spraying water droplets onto the descending molten ammonium nitrate to reduce the temperature of the said molten ammonium nitrate to not below 250° F. and without increasing the water content of the ammonium nitrate above 0.4%, and recovering the substantially anhydrous ammonium nitrate prills.

References Cited in the file of this patent
UNITED STATES PATENTS

| Number | Name | Date |
|---|---|---|
| 1,327,354 | Perry | Jan. 6, 1920 |
| 2,510,966 | Flanagan | June 13, 1950 |
| 2,528,407 | Yeandle | Oct. 31, 1950 |
| 2,773,753 | Stengel | Dec. 11, 1956 |
| 2,774,660 | Cook et al. | Dec. 18, 1956 |
| 2,811,748 | Smith | Nov. 5, 1957 |
| 2,921,335 | Bowers et al. | Jan. 19, 1960 |